US008246155B2

(12) United States Patent
Rengaswamy et al.

(10) Patent No.: US 8,246,155 B2
(45) Date of Patent: Aug. 21, 2012

(54) FIXER FOR A METALLIC INKJET INK SYSTEM

(75) Inventors: Sukanya Rengaswamy, Corvallis, OR (US); Christopher O. Oriakhi, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 660 days.

(21) Appl. No.: 11/736,768

(22) Filed: Apr. 18, 2007

(65) Prior Publication Data

US 2008/0259100 A1    Oct. 23, 2008

(51) Int. Cl.
*B41J 2/17* (2006.01)
(52) U.S. Cl. ............................ 347/98; 347/96; 347/100
(58) Field of Classification Search ............ 347/95–100; 106/31.86, 316, 31.13, 31.27, 31.6; 523/160, 523/161
See application file for complete search history.

(56) References Cited

U.S. PATENT DOCUMENTS

| | | | |
|---|---|---|---|
| 4,944,988 A | 7/1990 | Yasuda et al. | |
| 5,601,639 A * | 2/1997 | Myers et al. | 106/31.58 |
| 5,729,266 A | 3/1998 | Malhotra | |
| 6,087,051 A | 7/2000 | Shoji et al. | |
| 6,340,725 B1 | 1/2002 | Wang et al. | |
| 6,412,935 B1 * | 7/2002 | Doumaux | 347/99 |
| 6,450,632 B1 * | 9/2002 | Tsang et al. | 347/96 |
| 6,723,784 B2 | 4/2004 | Ito et al. | |
| 6,821,329 B2 | 11/2004 | Choy | |
| 6,830,326 B2 * | 12/2004 | Tsao et al. | 347/98 |
| 6,866,383 B2 | 3/2005 | Naik et al. | |
| 6,953,613 B2 * | 10/2005 | Reem et al. | 428/32.33 |
| 2003/0005945 A1 | 1/2003 | Onishi et al. | |
| 2003/0193553 A1 | 10/2003 | Issler | |
| 2004/0063808 A1 | 4/2004 | Ma et al. | |
| 2004/0202838 A1 | 10/2004 | Uerz et al. | |
| 2005/0007431 A1 * | 1/2005 | Koyano et al. | 347/95 |
| 2005/0068413 A1 * | 3/2005 | Hotta et al. | 347/264 |
| 2005/0078158 A1 * | 4/2005 | Magdassi et al. | 347/100 |
| 2005/0225618 A1 | 10/2005 | Askeland et al. | |
| 2005/0233097 A1 | 10/2005 | Tojo et al. | |
| 2006/0023044 A1 * | 2/2006 | Bauer | 347/100 |
| 2006/0100306 A1 | 5/2006 | Yau et al. | |
| 2006/0116439 A1 * | 6/2006 | Sarkisian et al. | 523/160 |
| 2006/0170746 A1 | 8/2006 | Jackson | |
| 2006/0258773 A1 * | 11/2006 | Schmid et al. | 523/160 |
| 2007/0076069 A1 * | 4/2007 | Edwards et al. | 347/100 |

FOREIGN PATENT DOCUMENTS

WO    2007040746    4/2007

* cited by examiner

*Primary Examiner* — Matthew Luu
*Assistant Examiner* — Rut Patel

(57) ABSTRACT

A fixer includes an aqueous vehicle, and at least one film-forming material selected from amine copolymers, polyamines, alkyl phenols, polycarboxylates, carboxylated acrylic copolymers, dendrimers, silicone polymers, acrylic acid copolymers, polystyrene sulfonates, polyvinyl sulfonates, dehydroxanthan gum, celluloses, cyclodextrin polymers, polymers having a terminal hydrophobic hydrocarbon group, polymers having a polyalkylene oxide group linked to a urethanyl group via a polyoxyalkyl amine group, polymers having a polyalkylene oxide group linked to a urethanyl group via a quaternized polyoxyalkyl amine group, polymers having a polyalkylene oxide group linked to a urethanyl group via a quaternized polyamine, and combinations thereof.

21 Claims, No Drawings

FIXER FOR A METALLIC INKJET INK SYSTEM

BACKGROUND

The present disclosure relates generally to fixers, and more particularly, to a fixer for a metallic inkjet ink system.

Inkjet printing is a non-impact printing method where droplets of ink are deposited on a print media, such as paper, to form a desired image. Inkjet ink sets or systems are generally used for inkjet printing. The ink system often includes a plurality of different colored inks, commonly in groups of four, six or eight colors (e.g., one or more shades of cyan, magenta, yellow and/or black), and may further include an image fixing/fixer fluid. The fixer is generally applied over or under the ink when the ink is established on the print media surface. The fixer interacts with the colorant of the ink(s) to thereby crash or otherwise fix the ink(s) to the print media surface.

Metallic inks often include a metal dispersed in an ink vehicle. One attribute of a metallic ink is its electrical conductivity. As such, metallic inks may be used as a coating material for various electrical devices. Another attribute of a metallic ink is its tendency to shine or exhibit a metallic luster when exposed to light, and, thus, such an ink may be desirable in printing processes.

Images printed with metallic inks may be susceptible to damage resulting from the ink's reaction to various elements in the environment (e.g., oxygen, ozone, sulfur dioxide, and/or other constituents of air), and/or to foreign materials that may contact the ink such as, for example, oils from a person's skin, water splashing, scuffing, and scratching. These elements may tend to deleteriously affect both the electrical conductivity as well as the shiny, metallic luster appearance. In some instances, impingement of atmospheric gases on the printed metallic inks may cause oxidation of, or other chemical reactions with the metal(s), resulting in discoloration and/or a decrease in metallic luster.

DETAILED DESCRIPTION

Embodiment(s) of the fixer for the metallic inkjet ink system as disclosed herein advantageously form a durable, protective, substantially colorless film or coating that may be established over and/or under the metallic ink to produce suitably high quality images having a shiny, metallic luster appearance. The fixer also advantageously protects the printed image from environmental and external effects, such as oxidation, water contact, corrosion, scratching, scuffing, and the like.

As used herein, the singular forms of the articles "a," "an," and "the" include plural references unless the content clearly dictates otherwise. Also, the phrase "effective amount," as used herein, refers to the minimal amount of a substance and/or agent that is sufficient to achieve a desired and/or required effect. For example, an effective amount of at least one surfactant is the minimum amount required in order to create a vehicle, while maintaining properties suitable for effective inkjet printing of the fixer.

As defined herein, the term "fixing fluid" or "fixer" refers to the combination of one or more fixing agents and a vehicle, wherein the fixing agent(s) chemically, electrically, or otherwise physically fix the colorant (e.g., a pigment, dye, or metal nanoparticle dispersion) of a metallic ink to a surface of a substrate.

As disclosed herein, the fixer is a substantially colorless or transparent liquid that forms a film or coat over and/or under the metallic ink when the metallic ink is established on the surface of the substrate. In an embodiment, the fixer includes an aqueous vehicle and at least one film-forming material.

The aqueous vehicle includes at least one solvent, at least one surfactant, and water. As defined herein, the term "aqueous vehicle" refers to the vehicle in which the fixing agent(s) is/are placed to form the fixer. Examples of suitable aqueous vehicle components include, but are not limited to, solvents, co-solvents, humectants, surfactants, additives, and/or water, and/or combinations thereof.

Several solvents may suitably be used, either alone or in combination, in the fixer formulation as disclosed herein. In an embodiment, at least one or all of the solvents are humectants. Humectants are often used in the fixer to prevent the fixer from drying out. Non-limiting examples of suitable humectants include 2-ethyl-2-hydroxymethyl-1,3-propanediol, glycerine, glyceryl triacetate, propylene glycol, diethylene glycol, tetraethylene glycol, polyols (e.g., sorbitol, polydextrose, xylitol urea, and lactic acid), lithium salts, magnesium salts, 1,5-pentanediol, 2-pyrrolidone, N-methylpyrrolidone, trimethylol propane, 1-butanol, ethoxylated glycerol, polyethylene glycols (e.g., PEG-300, PEG-400, PEG-600, PEG-1000, and PEG-2000), and combinations thereof. In an embodiment, the amount of solvents present in the fixer ranges from about 1 wt % to about 25 wt %. In another embodiment, the amount of solvents present in the fixer ranges from about 3 wt % to about 6 wt %.

The surfactant(s) are used in the fixer, at least in part, to adjust the surface tension of the fixer to an appropriate level, and to assist in controlling the physical properties of the fixer such as, for example, jetting stability, waterproofness, and bleeding. In an embodiment, the amount of surfactants present in the fixer ranges from about 0.02 wt % to about 4 wt %. In another embodiment, the amount of surfactants present in the fixer ranges from about 0.2 wt % to about 0.8 wt %.

Suitable surfactant(s) for the fixer are selected, at least in part, based on the structure and/or property relationship between components in the fixer composition and components in the metallic ink composition (that is printed with the fixer). For example, some anionic surfactants are compatible with some anionic polymers, and some cationic surfactants are compatible with some cationic polymers. In an embodiment, the surfactant(s) may be selected from nonionic surfactants, anionic surfactants, cationic surfactants, zwitterionic surfactants, or combinations thereof.

Several commercially available nonionic surfactants may be used in the formulation of the fixer, examples of which include ethoxylated alcohols such as those from the Tergitol® series (e.g., Tergitol® 15S5, Tergitol® 15S7), manufactured by Union Carbide, located in Houston, Tex.; surfactants from the Surfynol® series (e.g. Surfynol® 440 and Surfynol® 465), manufactured by Air Products and Chemicals, Inc., located in Allentown, Pa.; fluorinated surfactants, such as those from the Zonyl® family (e.g., Zonyl® FSO, Zonyl® FSA, and Zonyl® FSN surfactants), manufactured by E.I. duPont de Nemours Company, located in Wilmington, Del.; fluorinated PolyFox® nonionic surfactants (e.g., PG-154 nonionic surfactants), manufactured by Omnova, located in Fairlawn, Ohio; 2-diglycol surfactants, such as 1,2 hexanediol or 1,2-octanediol; and combinations thereof.

Non-limiting examples of suitable anionic surfactants for the fixer formulation include those anionic surfactants of the Dowfax® family (e.g., Dowfax® 8390), manufactured by Dow Chemical Company, located in Midland, Mich., or anionic Zonyl® surfactants (e.g., Zonyl® FSA), manufactured by E.I. duPont de Nemours and Company; phosphate ester surfactants including the surfactants of the Emphos® series and the DeDophoS® series, both manufactured by Witco Corp., Middlebury, Conn., the surfactants of the Hostaphat® series, manufactured by Clariant GmbH, Frankfurt, Germany, the surfactants of the ESI-Terge® series, manufactured by Cook Composites and Polymers Co., Kansas City, Mo., the surfactants of the Emulgen® series, manufactured by Kao Specialties Americas LLC, High Point, Nalco, the surfactants of the Crodafos® series, manufactured by Croda Inc., Edison, N.J., the surfactants of the Dephotrope® series and of the DePHOS® series, both manufactured by DeForest Enterprises Inc., Boca Raton, Fla.; alkyl sulfates (e.g., lauryl sulfate), alkyl ether sulfates (e.g., sodium laureth sulfate); N-lauroyl sarcosinate; dodecylbenzene sulfonate; and/or combinations thereof.

Cationic surfactants that are suitable for use in the fixer formulation include, but are not limited to those of the Quartamin® series, manufactured by Kao Corp., Tokyo, JP, cetyl trimethylammonium bromide (CTAB), other alkyltrimethylammonium salts, cetylpyridinium chloride (CPC), polyethoxylated tallow amine (POEA), benzalkonium chloride (BAC), benzethonium chloride (BZT), and/or the like, and/or combinations thereof.

Examples of suitable zwitterionic surfactants include, but are not limited to N-dodecyl-N,N-dimethyl-3-ammonio-1-propanesulfonate, ammonium carboxylates, ammonium sulfates, sulfobetaine-type surfactants, dodecyl betaine, dodecyl dimethylamine oxide, cocamidopropyl betaine, coco ampho glycinate, and/or the like, and/or combinations thereof.

One or more additives may also be incorporated into any of the embodiments of the fixer composition. As used herein, the term "additive" refers to a constituent of the fixer that operates to enhance performance, environmental effects, aesthetic effects, or other similar properties of the fixer. Examples of suitable additives include corrosion inhibitors, antioxidants, buffers, biocides, sequestering agents, chelating agents, and the like, and combinations thereof.

In an embodiment, the aqueous vehicle includes at least one additive selected from a water-soluble corrosion inhibitor, an antioxidant, and combinations thereof. In a non-limiting example, the amount of additives present in the fixer ranges from about 0.02 wt % to about 7 wt %.

Non-limiting examples of suitable water-soluble corrosion inhibitors include carboxybenzotriazole, such as, for example, COBRATEC CBT, which is commercially available from PMC Specialties Group, Inc., Cincinnati, Ohio; tolytriazole; monoethanolamine borate; monoisopropanolamine borate (MIPA); diisopropanolamine borate (DIPA); organic polycarboxylic acids such as, for example, IRGACOR L 190 or IRGACOR Plus, manufactured by Ciba, Tarrytown, N.Y.; derivatives of imidazoline, such as, for example, AMINE O, which is also manufactured by Ciba; amino tri methylene phosphonic acids, such as, for example, DEQUEST 2000, which is commercially available from Solutia Inc., St. Louis, Mo.; heterocyclic amines, such as, for example, N-SPEC 372, which is manufactured by Coastal Chemical Co., Lafayette, La.; and combinations thereof.

In an embodiment, the amount of water-soluble corrosion inhibitor(s) present in the fixer ranges from about 0.02 wt % to about 2.0 wt %. In another embodiment, the amount of water-soluble corrosion inhibitor(s) present in the fixer ranges from about 0.2 wt % to about 0.4 wt %.

Non-limiting examples of suitable antioxidants include ascorbic acid, citric acid, beta carotenes, and combinations thereof. In an embodiment, the amount of antioxidant(s) present in the fixer ranges from about 0.05 wt % to about 5 wt %. In another embodiment, the amount of antioxidant(s) present in the fixer ranges from about 0.2 wt % to about 0.4 wt %.

The fixer also includes water as a balance. In some embodiments, the amount of water present in the fixer ranges from about 40 wt % to about 95 wt %.

The fixer is generally formed by adding the film-forming material(s) to the aqueous vehicle. In an embodiment, the film-forming material(s) is/are selected from amine copolymers, polyamines, polycarboxylates, carboxylated acrylic copolymers, alkyl phenols, dendrimers, silicone polymers, acrylic acid copolymers, polystyrene sulfonates, polyvinyl sulfonates, dehydroxanthan gum, celluloses, cyclodextrin polymers, polymers having a terminal hydrophobic hydrocarbon group, polymers having a polyalkylene oxide group linked to a urethanyl group via a polyoxyalkyl amine group, polymers having a polyalkylene oxide group linked to a urethanyl group via a quaternized polyoxyalkyl amine group, polymers having a polyalkylene oxide group linked to a urethanyl group via a quaternized polyamine, and/or combinations thereof.

Examples of the film-forming amine copolymers or polyamines include, but are not limited to FLOQUAT FL 2350 manufactured by SNF Inc., Riceboro, Ga., 4-methylmorpholine-N-oxide, poly[bis(2-chloroethyl)ether-alt-1,3-bis[3-(dimethylamino)propyl]urea], quaternized poly[bis(2-chloroethyl)ether-alt-1,3-bis[3-(dimethylamino)propyl]urea], linear polyethyleneimines, branched polyethyleneimines, quaternized polyethylenimine, poly(2-ethyl-2-oxazoline), carboxymethyl chitosan, poly-D-glucosamine, poly(acrylamide-co-ciallyldimethylammonium chloride, or the like, or combinations thereof.

Non-limiting examples of the film-forming polycarboxylates include polyacrylic acids, acrylic acids, acrylic acid copolymers, methacrylate copolymers, sodium or potassium salts thereof, and/or the like, and/or combinations thereof; and non-limiting examples of carboxylated acrylic copolymers include DERMACRYL 79, which is commercially available from National Starch and Chemical Company, Bridgewater, N.J.

Examples of suitable film-forming anionic polymers or copolymers include, but are not limited to dehydroxanthan gum, polystyrene sulfonates, polyvinyl sulfonates, acrylic acid copolymers, or the like, or combinations thereof.

Non-limiting examples of suitable film-forming cationic polymers or copolymers include polymers having a terminal hydrophobic hydrocarbon group, polymers having a polyalkylene oxide group linked to a urethanyl group via a polyoxyalkyl amine group, polymers having a polyalkylene oxide group linked to a urethanyl group via a quaternized polyoxyalkyl amine group, polymers having a polyalkylene oxide group linked to a urethanyl group via a quaternized polyamine, or the like, or combinations thereof.

Still other suitable film-forming materials include silicone polymers, such as, for example, PEG-8 dimethicone (a non-limiting example of which includes Solsoft® 810, manufactured by Kobo Products, Inc., South Plainfield, N.J.); alkyl phenols, such as, for example, an alkyl phenol based polyethylene wax emulsion (a non-limiting example of which includes Polywax-500 manufactured by the Bareco Division of Baker Petrolite, Inc., Sugarland, Tex.) and HDPE 40; dendrimers; cellulose and its derivatives (e.g., hydroxylethyl cellulose, (hydroxylpropyl)methyl cellulose, (hydroxylpropyl) methyl cellulose phthalate); cyclodextrin polymers (e.g., methyl-β-cyclodextrin, (2-hydroxypropyl)-α-cyclodextrin (HPαCD), (2-hydroxypropyl)-β-cyclodextrin (HPβCD)); other like materials; and/or combinations thereof.

It is to be understood that any combinations of the film-forming materials may be used.

In a non-limiting example, the amount of the film-forming material(s) present in the fixer ranges from about 0.05 wt % to about 10 wt %. In another non-limiting example, the amount of the film-forming material(s) present in the fixer ranges from about 0.1 wt % to about 2 wt %.

The combination of the several components of the aqueous vehicle and the one or more film-forming materials forms the substantially colorless fixer that may be used in conjunction with metallic inks. As disclosed herein, embodiment(s) of the fixer may be incorporated into a metallic inkjet ink system that further includes at least one metallic ink. It is to be understood that the general function of the fixer is to crash or otherwise fix the colorant of the metallic inks to the surface of the substrate.

Generally, any metallic ink may be used in the inkjet ink system, specific non-limiting examples of which include a silver metallic ink, a gold metallic ink, a chrome metallic ink, a bronze metallic ink, a platinum metallic ink, a palladium metallic ink, a composite green metallic ink, a black metallic ink, an ink having a metal nanoparticles dispersion, and combinations thereof.

The durability and permanence of the metallic ink are achieved by printing the fixer over, under, or both over and under the established ink layer. As such, the fixer may be printed before the ink, after the ink, or before and after the ink has been established on the surface of the substrate. In a non-limiting example, the fixer is established on the substrate, and then the metallic ink is established on the fixer, thereby forming a fixer undercoat. In another non-limiting example, the metallic ink is established on the substrate, and the fixer is established over the metallic ink, thereby forming a fixer overcoat. In still another non-limiting example, the fixer is established on the substrate, the metallic ink is established on the fixer, and another layer of the fixer is established on the metallic ink, thereby forming both a fixer undercoat and a fixer overcoat.

The amount of ink established on the substrate depends, at least in part, on the desirable image to be produced. The image may include alphanumeric indicia and/or graphic indicia. Alternatively, the image may simply be an electrically conductive coating layer suitable for electronic devices. The amount and/or formulation of the fixer established on and/or under the image depends, at least in part, on the desirable properties of the image (e.g., oxidation resistance, scratch resistance, smudge resistance, etc).

In an embodiment, the substrate is selected from plain papers, porous papers, coated papers, glossy photo-papers, semi-gloss photo-papers, heavy weight matte papers, billboard papers, vinyl papers, nonporous papers, high gloss polymeric films, transparencies, and/or combinations thereof.

Establishing the metallic inks and the fixer may be accomplished via inkjet printing. As used herein, the term "inkjet printing" refers to non-impact methods for producing images and/or coating layers by the deposition of ink and/or fixer droplets in a pixel-by-pixel manner onto an image-recording medium (i.e., a substrate) in response to appropriate commands, such as digital signals. Various methods may be employed to control the deposition of the ink droplets on the substrate to form the desired image. Non-limiting examples of suitable inkjet printing processes include thermal inkjet printing, piezoelectric inkjet printing, continuous inkjet printing, and/or combinations thereof.

While several embodiments have been described in detail, it will be apparent to those skilled in the art that the disclosed embodiments may be modified. Therefore, the foregoing description is to be considered exemplary rather than limiting.

What is claimed is:

1. A metallic inkjet ink system, comprising:
    a fixer, including:
        an aqueous vehicle; and
        at least one film-forming material selected from 4-methylmorpholine-N-oxide, poly[bis(2-chloroethyl) ether-alt-1,3-bis[3-(dimethylamino)propyl]urea], poly(2-ethyl-2-oxazoline), poly(acrylamide-co-diallyldimethylammonium chloride), dendrimers, alkyl phenols, cyclodextrin polymers, silicone polymers, dehydroxanthan gum, polymers having a terminal hydrophobic hydrocarbon group, polymers having a polyalkylene oxide group linked to a urethanyl group via a polyoxyalkyl amine group, and combinations thereof; and
    at least one metallic ink;
    wherein the fixer is substantially colorless, and is configured to enhance durability, permanence, or combinations thereof of the at least one metallic ink when both are printed on a substrate.

2. The metallic inkjet ink system as defined in claim 1 wherein the aqueous vehicle includes:
    an effective amount of at least one humectant;
    an effective amount of at least one surfactant;
    at least one water-soluble corrosion inhibitor selected from carboxybenzotriazole, tolyltriazole, monoethanolamine borate, monoisopropanolamine borate, diisopropanolamine borate, amino trimethylene phosphonic acid, a derivative of imidazoline, and combinations thereof; and
    water.

3. The metallic inkjet ink system as defined in claim 2 wherein the at least one water-soluble corrosion inhibitor is present in an amount ranging from about 0.02 wt % to about 7 wt %.

4. The metallic inkjet ink system as defined in claim 2 wherein the at least one humectant is selected from 2-ethyl-2-hydroxymethyl-1,3-propanediol, glycerine, glyceryl triacetate, propylene glycols, polyethylene glycols, polyols, lithium salts, magnesium salts, 1,5-pentanediol, 2-pyrrolidone, diethylene glycol, tetraethylene glycol, trimethylol propane, 1-butanol, ethoxylated glycerol, N-methylpyrrolidone, and combinations thereof.

5. The metallic inkjet ink system as defined in claim 2 wherein the at least one humectant is present in an amount ranging from about 1 wt % to about 25 wt %, and wherein the at least one surfactant is present in an amount ranging from about 0.02 wt % to about 4 wt %.

6. The metallic inkjet ink system as defined in claim 1 wherein the cyclodextrin polymers are selected drom methyl-β-cyclodextrin, (2-hydroxypropyl)-α-cyclodextrin (HPαCD), and (2-hydroxypropyl)-β-cyclodextrin (HPβCD).

7. The metallic inkjet ink system as defined in claim 1 wherein the at least one metallic ink is selected from a silver metallic ink, a gold metallic ink, a chrome metallic ink, a bronze metallic ink, an aluminum metallic ink, a copper metallic ink, a green metallic ink, a black metallic ink, an ink having a metal nanoparticle dispersion, and combinations thereof.

8. A method of using the system as defined in claim 1, the method comprising:
    establishing the metallic ink on at least a portion of a substrate; and establishing the fixer over at least a portion of the metallic ink, under at least a portion of the metallic ink, or combinations thereof.

9. The method as defined in claim 8 wherein the substrate is selected from plain papers, porous papers, coated papers, glossy photopapers, semi-gloss photopapers, heavy weight matte papers, billboard papers, vinyl papers, nonporous papers, high gloss polymeric films, transparencies, and combinations thereof.

10. The method as defined in claim 8 wherein establishing is accomplished via thermal inkjet printing, piezoelectric inkjet printing, continuous inkjet printing, or combinations thereof.

11. A metallic inkjet ink system, comprising:
a fixer, consisting essentially of:
at least one surfactant present in an amount ranging from about 0.02 wt % to about 4 wt %;
at least one humectant present in an amount ranging from about 1 wt % to about 25 wt %;
at least one additive present in an amount ranging from about 0.02 wt % to about 7 wt %;
at least one film-forming material present in an amount ranging from about 0.05 wt % to about 10 wt %, wherein the at least one film-forming material is selected from 4-methylmorpholine-N-oxide, poly[bis(2-chloroethyl)ether-alt-1,3-bis[3-(dimethylamino)propyl]urea], poly(2-ethyl-2-oxazoline), poly(acrylamide-co-diallyldimethylammonium chloride), dendrimers, alkyl phenols, cyclodextrin polymers, silicone polymers, polymers having a terminal hydrophobic hydrocarbon group, polymers having a polyalkylene oxide group linked to a urethanyl group via a polyoxyalkyl amine group, and combinations thereof; and
water; and
at least one metallic ink.

12. A fixer for a metallic ink, comprising:
an aqueous vehicle; and
at least one film-forming material selected from 4-methylmorpholine-N-oxide, poly[bis(2-chloroethyl)ether-alt-1,3-bis[3-(dimethylamino)propyl]urea], poly(2-ethyl-2-oxazoline), poly(acrylamide-co-diallyldimethylammonium chloride), alkyl phenols, dendrimers, silicone polymers, dehydroxanthan gum, cyclodextrin polymers, polymers having a terminal hydrophobic hydrocarbon group, polymers having a polyalkylene oxide group linked to a urethanyl group via a polyoxyalkyl amine group, and combinations thereof;
wherein the fixer is configured to be printed at least one of over or under the metallic ink.

13. The fixer as defined in claim 12 wherein the aqueous vehicle includes:
at least one humectant;
at least one surfactant; and
water.

14. The fixer as defined in claim 13 wherein the aqueous vehicle further includes at least one additive selected from a water-soluble corrosion inhibitor, an antioxidant, and combinations thereof.

15. The fixer as defined in claim 14 wherein the water-soluble corrosion inhibitor is selected from carboxybenzotriazole, tolyltriazole, monoethanolamine borate, monoisopropanolamine borate (MIPA), diisopropanolamine borate (DIPA), amino trimethylene phosphonic acid, imidazoline derivatives, heterocyclic amines, and combinations thereof, and the antioxidant is a beta carotene.

16. The fixer as defined in claim 13 wherein the at least one humectant is selected from 2-ethyl-2-hydroxymethyl-1,3-propanediol, glycerine, glyceryl triacetate, propylene glycol, a polyol, a lithium salt, a magnesium salt, 1,5-pentanediol, 2-pyrrolidone, diethylene glycol, tetraethylene glycol, trimethylol propane, 1-butanol, ethoxylated glycerol, N-methylpyrrolidone, polyethylene glycols, and combinations thereof.

17. The fixer as defined in claim 12 wherein the cyclodextrin polymers are selected from methyl-$\beta$-cyclodextrin, (2-hydroxypropyl)-$\alpha$-cyclodextrin (HP$\alpha$CD), and (2-hydroxypropyl)-$\beta$-cyclodextrin (HP$\beta$CD).

18. The fixer as defined in claim 12 wherein an amount of the at least one film-forming material ranges from about 0.05 wt % to about 10 wt %.

19. The fixer as defined in claim 12 wherein the fixer is configured to be printed over the metallic ink.

20. The fixer as defined in claim 12 wherein the selected at least one film-forming material is a combination of 4-methylmorpholine-N-oxide and poly[bis(2-chloroethyl)ether-alt-1,3-bis[3-(dimethylamino)propyl]urea].

21. The fixer as defined in claim 20 wherein the aqueous vehicle includes:
at least one humectant;
at least one surfactant;
a water-soluble corrosion inhibitor selected from carboxybenzotriazole, tolyltriazole, monoethanolamine borate, monoisopropanolamine borate (MIPA), diisopropanolamine borate (DIPA), amino trimethylene phosphonic acid, imidazoline derivatives, heterocyclic amines, and combinations thereof; and
water.

* * * * *

UNITED STATES PATENT AND TRADEMARK OFFICE
CERTIFICATE OF CORRECTION

PATENT NO. : 8,246,155 B2  
APPLICATION NO. : 11/736768  
DATED : August 21, 2012  
INVENTOR(S) : Sukanya Rengaswamy et al.

It is certified that error appears in the above-identified patent and that said Letters Patent is hereby corrected as shown below:

In column 6, line 54, in Claim 6, delete "drom" and insert -- from --, therefor.

Signed and Sealed this
Nineteenth Day of March, 2013

Teresa Stanek Rea
*Acting Director of the United States Patent and Trademark Office*